United States Patent [19]

Kennedy

[11] Patent Number: 5,605,554
[45] Date of Patent: Feb. 25, 1997

[54] MULTI-PIECE AIR FILTER HOUSING AND CLOSURE ARRANGEMENT

[75] Inventor: Gary I. Kennedy, Clarkston, Mich.

[73] Assignee: Siemens Electric Limited, Windsor, Canada

[21] Appl. No.: 520,994

[22] Filed: Aug. 30, 1995

[51] Int. Cl.⁶ ................................................. B01D 46/10
[52] U.S. Cl. .......................... 55/493; 55/385.3; 55/502; 55/503; 123/198 E
[58] Field of Search ............................ 55/493, 502, 503, 55/504, 511, DIG. 31, 385.3; 95/273; 123/198 E

[56] References Cited

U.S. PATENT DOCUMENTS

| | | | |
|---|---|---|---|
| 3,823,926 | 7/1974 | Bracich | 55/504 |
| 4,130,405 | 12/1978 | Akado et al. | 55/503 |
| 4,438,057 | 3/1984 | Sundseth | 55/502 |
| 4,440,555 | 4/1984 | Chichester | 55/503 |
| 4,925,469 | 5/1990 | Clement et al. | 55/502 |
| 4,995,891 | 2/1991 | Jaynes | 55/497 |
| 5,125,941 | 6/1992 | Ernst et al. | 55/504 |
| 5,213,596 | 5/1993 | Kume et al. | 55/502 |
| 5,472,464 | 12/1995 | Mochida | 55/503 |

*Primary Examiner*—Jay H. Woo
*Assistant Examiner*—Duane S. Smith
*Attorney, Agent, or Firm*—Russel C. Wells

[57] ABSTRACT

An air filter housing including top and bottom housing portions joined by a catch. The housing portions each include a plurality of walls joined together to define an enclosure with and opening circumscribed by an edge. The edge of each portion includes a surface for contacting a seal disposed between the surfaces when the housing portions are joined to form the filter housing. The portions are joined by a hinge assembly and a catch which extends along a side of the filter housing to compress the seal between the portions to form a generally air tight seal therebetween. Typically the seal is integral with a filter element which is in an air flow path between openings in the housing portions.

20 Claims, 5 Drawing Sheets

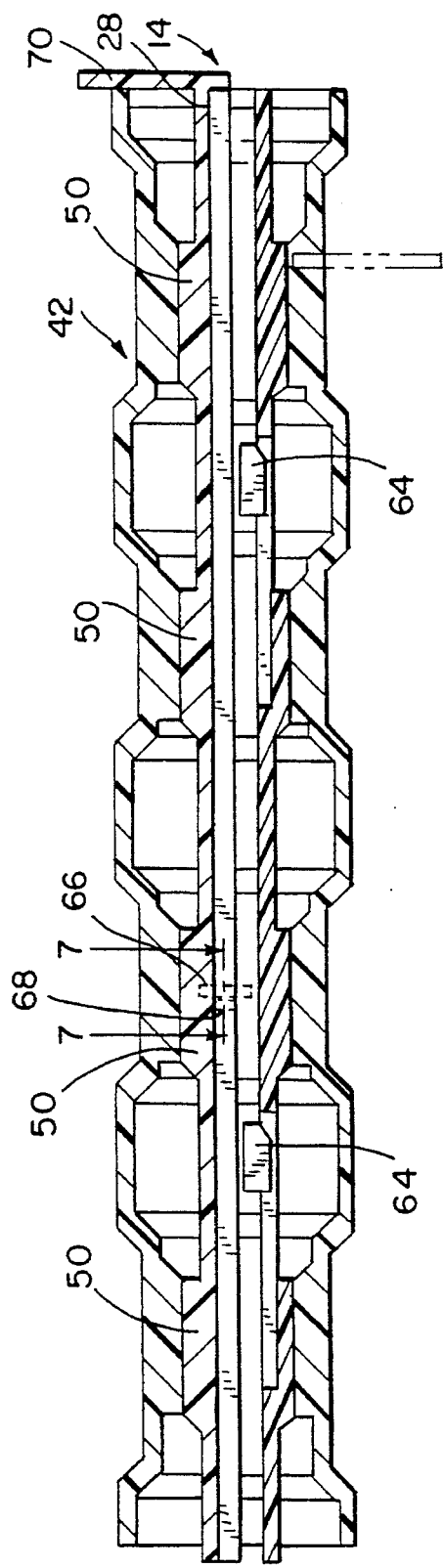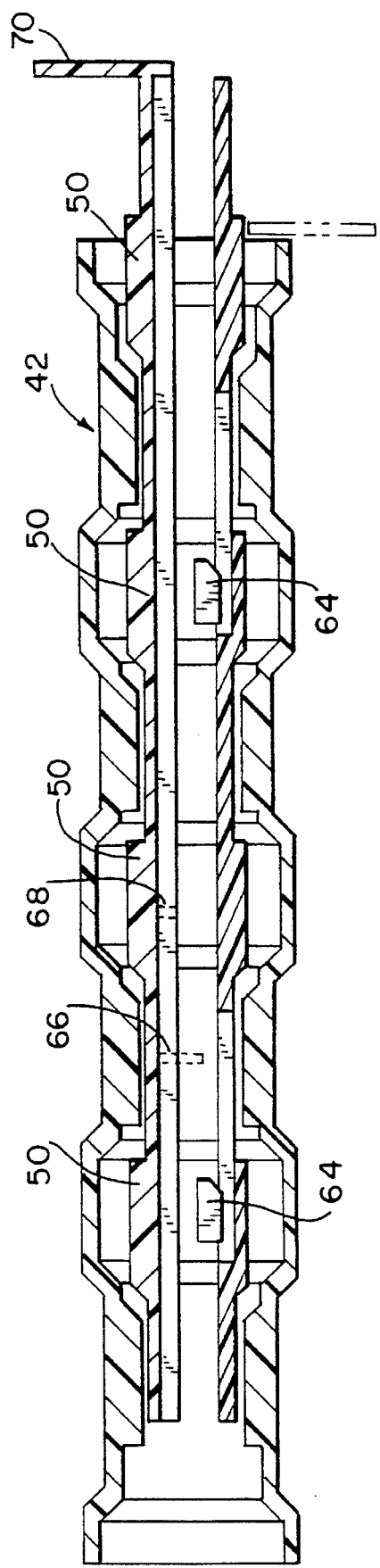

MULTI-PIECE AIR FILTER HOUSING AND CLOSURE ARRANGEMENT

BACKGROUND OF THE INVENTION

The present invention relates to an air filter enclosure of the type useable for filtering the intake air of an internal combustion engine. In particular, the present invention relates to an air filter housing assembled from multiple portions and an arrangement for fastening the portions at their periphery to form the housing.

In general, prior structures for fastening the portions of air filter housings together and secure a seal therebetween include over-center catches constructed of steel wire or a metal stamping, metal screws, nuts and torque limiting fasteners. These structures were typically equally spaced around the joint between the housing portions to fasten the portions together. This spacing was used in an attempt to provide a generally uniform pressure on the seal between the portions to avoid air leakage at locations which would permit unfiltered air to enter the intake of the associated engine.

A problem with over-center catches is the inability to economically manufacture housing portions which apply adequate pressure to the seal without warping and producing unwanted leakage of unfiltered air into the associated engine. Another problem with over-center catches is the complexity of the mold required to produce the latching surfaces (i.e. undercuts which make plastic part removal from a mold difficult) on the housing portions which are engaged by the catch. Furthermore, many catches presently used for the above-described purpose are difficult to open by hand.

A problem with the use of combinations of screws, bolts, nuts and wing nuts for fastening housing portions together is the inability to insure application or relatively consistent torque to all of the screws, bolts, nuts or wing nuts holding the housing portions together. Without relatively consistent torques and/or the complete absence of a fastener, the housing may warp and fail to provide a seal which prevents unwanted leakage of unfiltered air into the associated engine. Furthermore, metal fasteners may corrode over time and prevent disassembly of the portions of a filter housing by hand and without the use of tools.

In view of the problems inherent with presently available arrangements for joining the portions of a filter housing, it would be desirable to provide an arrangement for joining the portions of a filter housing which is efficiently molded from an appropriate material such as plastic, easy to handle and not easily dropped or lost in a relatively inaccessible portion of the engine, easily engaged with the housing portions when fastening the portions together, easily removed from the housing portions to permit filter replacement, and configured to force the housing portions together at the seal therebetween to provide relatively uniform pressure on the seal.

SUMMARY OF THE INVENTION

The present invention relates to an air filter housing. The housing includes a compressible seal, first and second housing portions and a one-piece clamp. The first housing portion includes a first edge including at least two spaced hook members, and the second housing portion includes a second edge including at least one hook member. The clamp has a generally U-shaped cross-section including first and second parallel legs. The first leg includes at least two spaced catches, and the second leg includes at least one catch. The first and second housing portions are joinable to form an enclosure with the seal positioned therebetween. The catches of the first leg are engaged with the two spaced hook members of the first housing portion, and the catch of the second leg is engaged with the hook member of the second housing portion to compress the seal between the housing portions.

The present invention further relates to an air filter assembly. The assembly includes an air filter element joined to a seal, first and second housing portions and a one-piece clamp. The first housing portion includes a first air passage and a first seal flange including first and second spaced latch surfaces, and the second housing portion includes a second air passage and a second seal flange including a third latch surface. The clamp includes first, second and third catches. The first and second seal flanges are joined by the seal to form a generally air-tight air path between the first and second air passages, and the first, second and third latch surfaces are engaged with the first, second and third catches, respectively, to compress the seal between the first and second seal flanges.

In another configuration of the filter assembly, the air filter element is joined to and circumscribed by a resilient seal having a rectangular shape. The first housing portion includes a first air passage tube attached thereto and a first opening defined by first and second parallel seal flanges joined to third and fourth seal flanges, wherein the opening has the rectangular shape, the first seal flange including at least four spaced latch surfaces, and the second seal flange including a first hooking arrangement. The second housing portion includes a second air passage tube attached thereto and a second opening defined by fifth and sixth parallel seal flanges joined to seventh and eight seal flanges, wherein the second opening has the rectangular shape, the fifth seal flange including a bottom latch surface, and the sixth seal flange including a second hooking arrangement. The one-piece clamp includes at least four spaced top catches and at least four bottom catches, and the seal flanges of housings are joined by the seal to form a generally air-tight air path between the first and second air passage tubes when the clamp is attached to the housing portions.

BRIEF DESCRIPTION OF THE DRAWINGS

FIGS. 4A and 4B are sectional views of the housing pieces and first and second embodiments of the clamp taken along line 4—4 of FIG. 3 with the clamp in the engaged position;

FIGS. 5A and 5B are sectional views of the housing pieces and first and second embodiments of the clamp taken along line 4—4 of FIG. 3 with the clamp in the disengaged, but not rotated, position;

DETAILED DESCRIPTION OF THE PREFERRED EMBODIMENT

Figure 1:
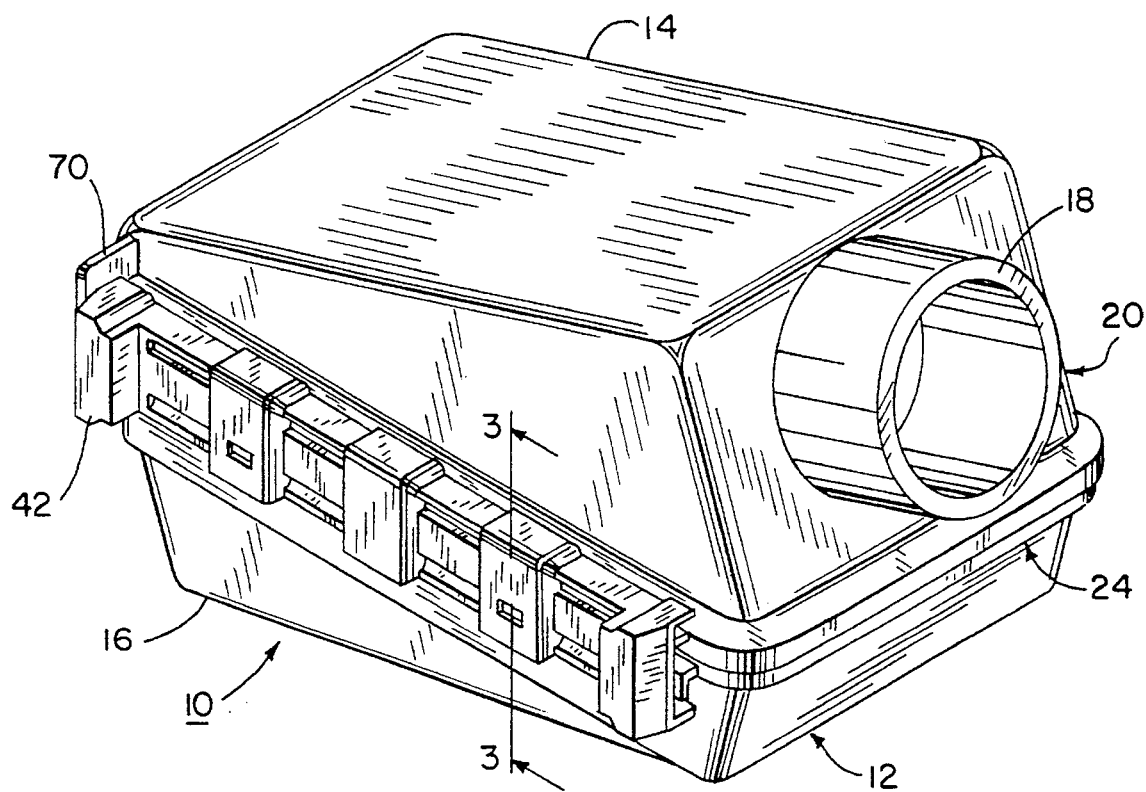
FIG. 1 is a perspective view of a two-piece air filter housing and a clamp for joining the two pieces thereof.

Referring to FIG. 1, an air filter assembly 10 includes a housing 12 having a top housing portion 14 and a bottom housing portion 16. Top housing portion 14 includes a shell configured as shown in FIG. 1 and a tubular air passage 18 which provides an air passage from the exterior of assembly 10 to the interior of assembly 10. Housing portion 14 is circumscribed by a generally rectangular edge 20 which defines an opening 22 (FIG. 3) to portion 14. Bottom housing portion 16 includes a shell which may be configured to have a shape similar to that of housing 14, and also includes an air passage tube (not shown) to permit air to pass from the exterior of assembly 10 to the interior of assembly 10. Portion 16 also includes a rectangular edge 24 which defines an opening 26 (FIG. 3) of portion 16.

Portion 14 includes a seal flange 28 at edge 20 which circumscribes opening 22. Similarly, housing portion 16 includes a seal flange 30 at edge 24 which circumscribes opening 26 of portion 16. Assembly 10 also includes a seal which may be of the type integrally formed with an air filter element 34. More specifically, seal 32 is fabricated from a compressible rubber-type material with a rectangular shape and size generally the same as flanges 28 and 30. When combined with element 34, seal 32 is typically molded to engage the circumferential edge of element 34 to form an integral air filter unit 35. By way of example, air filter element 34 may be a paper filter which may include a rigid metal or plastic grid to prevent deformation or destruction of the filter element when a pressure gradient exists across the filter element during air flow through assembly 10.

Figure 3:
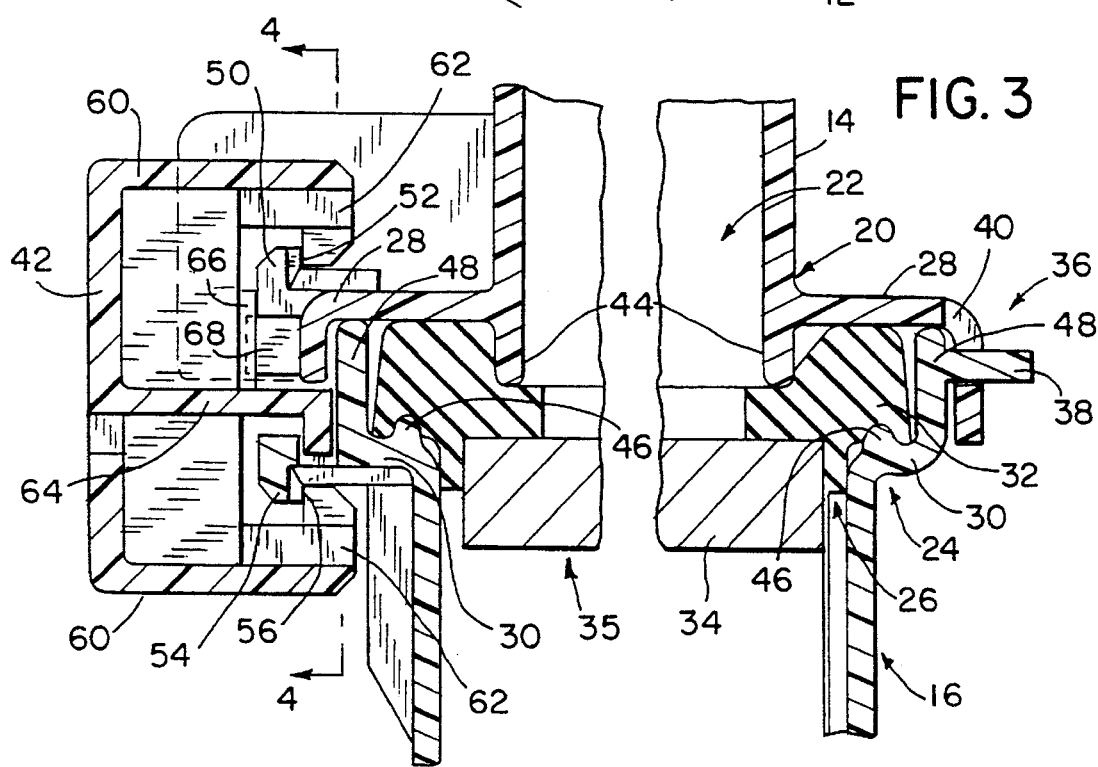
FIG. 3 is a sectional view taken along line 3—3 of FIG. 1.

Referring to FIG. 3, top and bottom housing portions 14 and 16 are joined on one side by an assembly 36. In the present embodiment of air filter assembly 10, assembly 36 includes a plurality of tabs 38 extending along one side of seal flange 30 and a plurality of hook members 40 extending along the associated side of seal flange 28. When hook members 40 are engaged with tabs 38 as shown in FIG. 3, housing portion 14 may be pivoted at tabs 38 relative to housing portion 16. This arrangement of hook members 40 and tabs 38 along one side of housing portions 14 and 16 provides attachment of portions 14 and 16 without fasteners and permits the complete disassembly of housing portions 14 and 16. Alternatively, depending upon the application, this interaction of portions 14 and 16 can be modified to permit insertion and removal of the air filter unit 35 without completely removing portion 14 from portion 16. By way of modification, assembly 36 may take other forms such as a conventional metallic hinge appropriately fastened to flanges 28 and 30.

Assembly 10 also includes a clamp 42. Clamp 42 engages seal flanges 28 and 30 along one side of housing 12 as shown in FIG. 3. As is described in further detail below, clamp 42 is a one-piece clamp which engages flanges 28 and 30 along the full length of one side of housing 12 to cooperate with assembly 36 so that seal flanges 28 and 30 engage and compress seal 32 between housing portions 14 and 16. When completely assembled, assembly 10 provides a generally airtight air path between air passage tube 18 and the air passage tube of housing portion 16. To ensure adequate sealing between sealing flange 28 and seal 30, housing portion 14 may be fabricated (e.g., molded) to include a lip 44 formed at flange 28 to circumscribe opening 22. Lip 44 assists in entrapping and retaining seal 32 between the seating surfaces of flanges 28 and 30. Similarly, to improve sealing between seal 32 and flange 30, housing portion 16 may be formed (e.g., molded) to include a sealing lip 46 formed at flange 30 to circumscribe opening 26. To further improve the interaction of flanges 28 and 30 and seal 32, a spacer 48 formed about the periphery of flange 32 is utilized. More specifically, spacer 48 is sized so that seal 32 is compressed by a predetermined amount to ensure proper compression of seal 32 while preventing overcompression of seal 32. (As shown in FIG. 3, the present embodiment of spacer 48 supports tabs 38 along the side of housing 12 which includes hinge assembly 36.)

Figure 2:
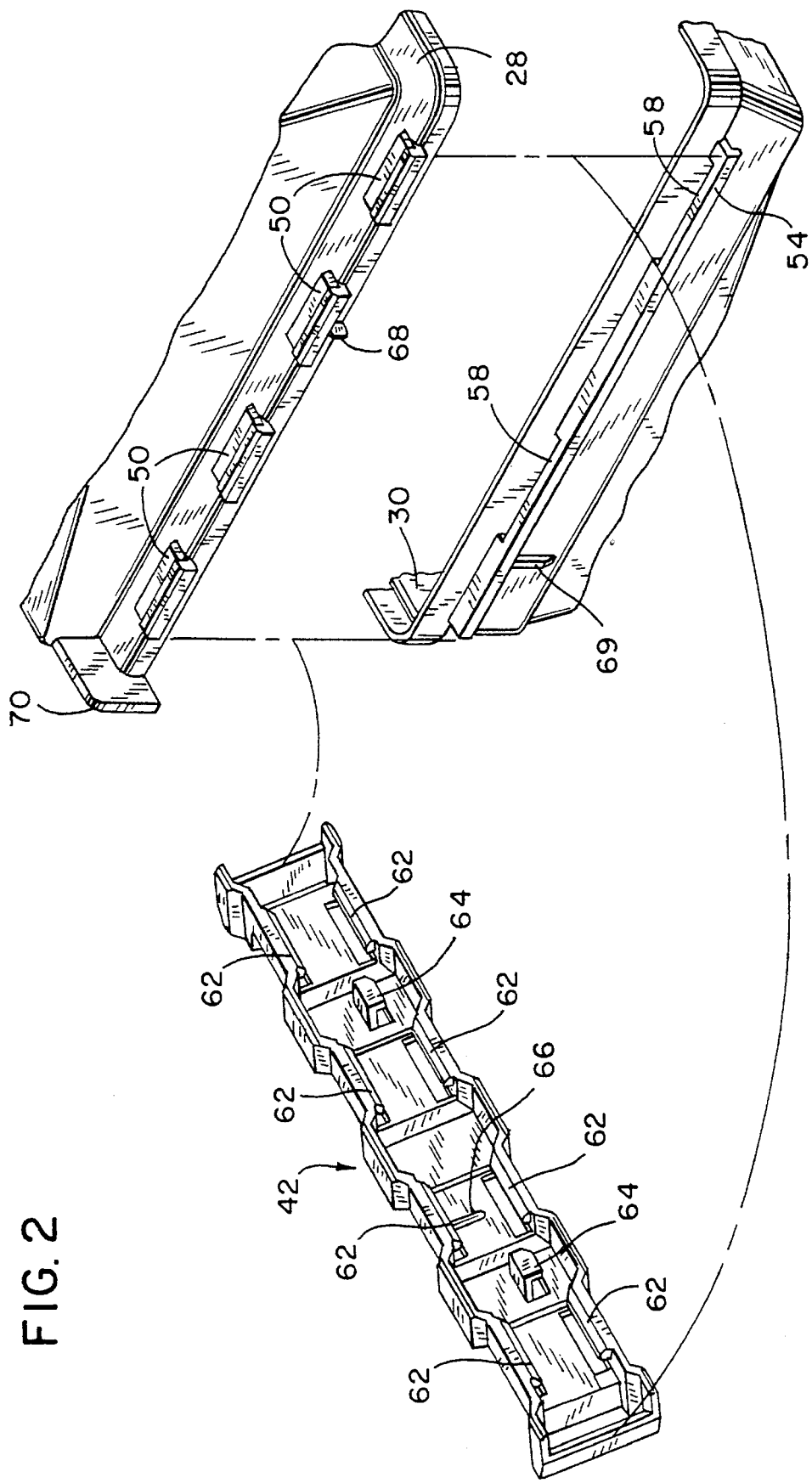
FIG. 2 is an exploded, perspective view of the side portions of the two housing pieces and the clamp associated with the respective side pieces.
Figure 6:
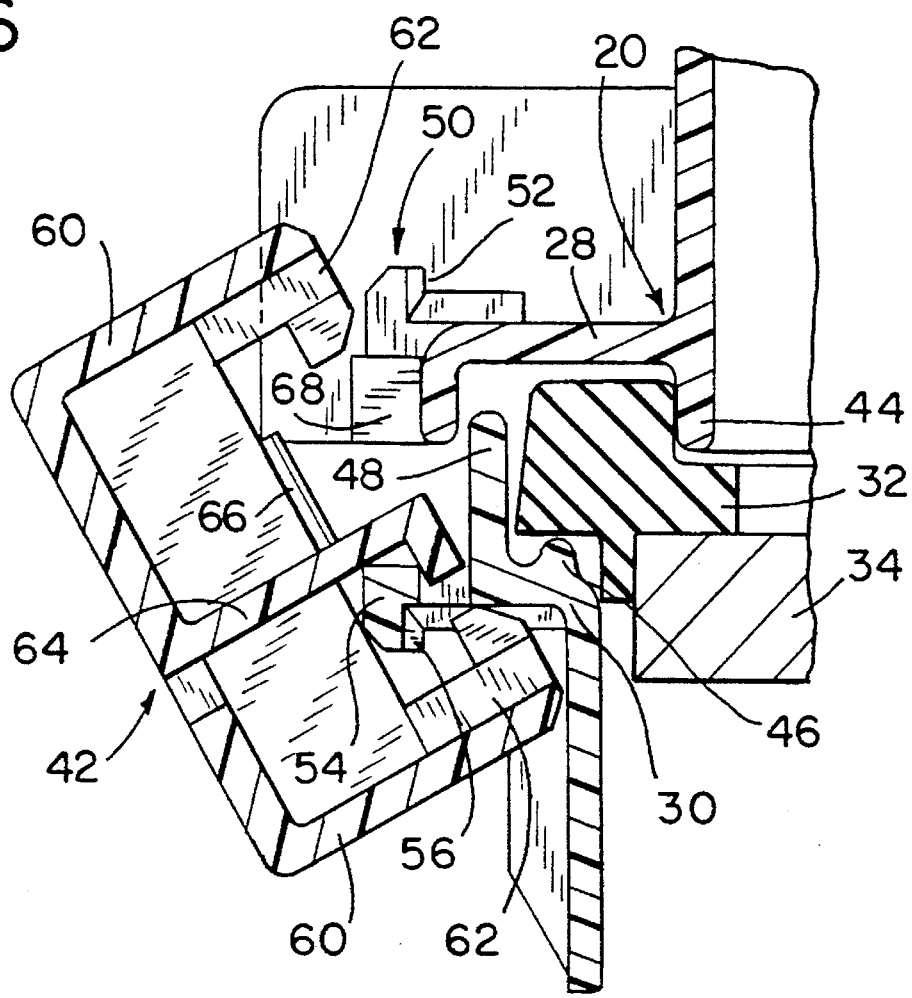
FIG. 6 is a sectional view of the catch pivotally engaged with the bottom housing piece and disengaged from the top housing piece.

Referring now to FIG. 2, the portion of seal flange 28 which is engaged by clamp 42 includes four spaced hook members 50. Referring to FIGS. 3 and 6, hook members 50 are formed on flange 28 and each include a latch surface 52. Seal flange 30 includes a hook member 54 extending along seal flange 30 at the location which clamp 42 engages seal flange 30 (FIG. 2). Hook member 54 includes a latch surface 56 and a pair of retaining slots 58.

Referring again to FIGS. 3 and 6, clamp 42 has a generally U-shaped cross-section including two parallel legs 60 each terminating in a hook (catch) member 62. Clamp 42 also includes a pair of retaining tabs 64 and a locking tab 66. As with housing portions 14 and 16, clamp 42 may be fabricated (molded) from an appropriate plastic material (thermoset or thermoplastic).

Figure 4B:
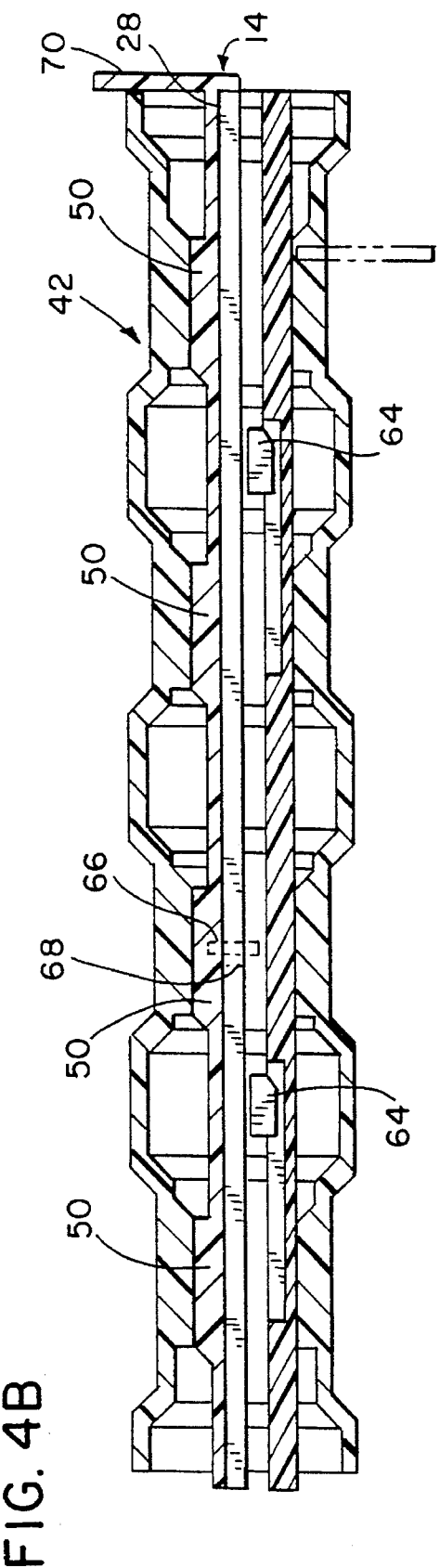

Turning now to the interaction of clamp 42 and flanges 28 and 30 to fasten housing portions 14 and 16 together against seal 32, top hook members 62 are engaged with the respective latch surfaces 52 of hook members 50, and bottom hook members 62 are engaged with latch surface 56 of hook member 54. Additionally, retaining tabs 64 slidably engage retaining slots 58. Referring to FIG. 4A, when clamp 42 is fully engaged with portions 14 and 16, clamp 42 is positioned against a stop 70 formed on housing portion 14 as shown in FIGS. 1 and 2. A rib 69 (FIG. 2) is provided to prevent clamp 42 from being slid to the left unless it is engaged with both housing portions 14 and 16. This arrangement of rib 69 prevents a user from snapping members 62 into engagement with surfaces 52, rather than sliding them into engagement.

Figure 5B:
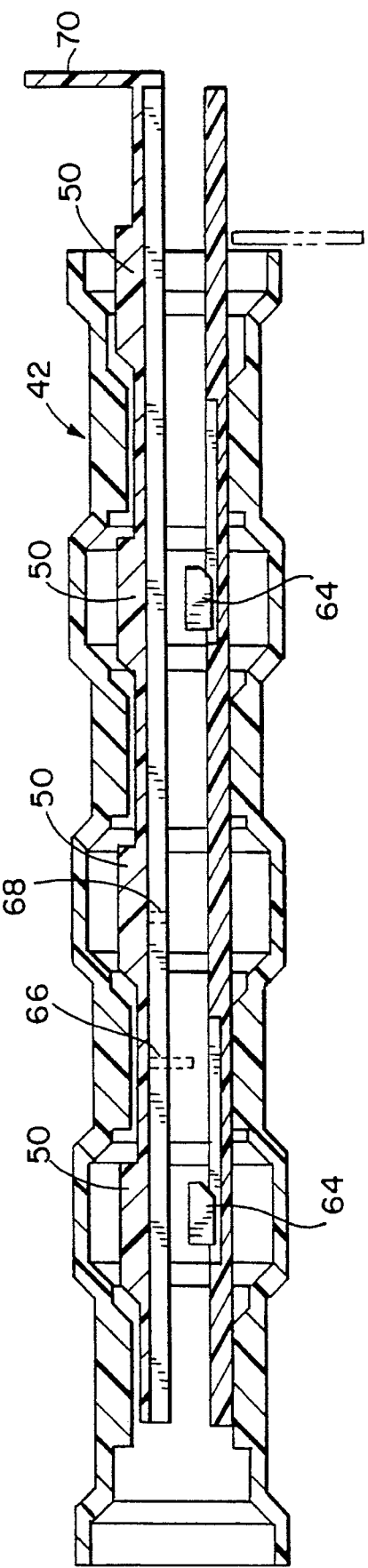
Figure 7:
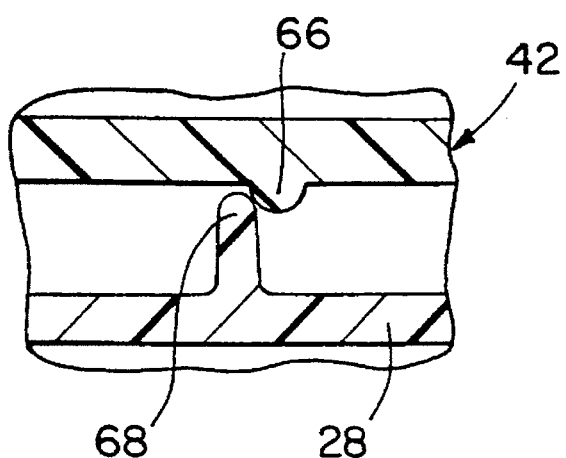
FIG. 7 is a sectional view taken along line 7—7 of FIG. 4.

Additionally, locking tabs 66 rest against a locking projection 68 formed on seal flange 28 as shown in FIG. 7. To open housing portions 14 and 16, clamp 42 is slid away from stop member 70 against the initial locking force produced by the interaction of tabs 66 and projection 68, and then along flanges 28 and 30 so that hook members 62 fully disengage hook members 50 as shown in FIG. 5. Upon disengagement of hook members 62 and 50, clamp 42 may be pivoted counter-clockwise about flange 30 so that clamp 42 clears flange 28 to permit opening of housing portions 14 and 16. The ability to fully disengage clamps 62 and hook members 50 is provided by the spacing therebetween as shown in FIGS. 2, 4 and 5.

The engagement of retaining tabs 64 with retaining slots 58, and the engagement of hook members 62 with hook member 54 permits pivoting of clamp 42 about member 54. To completely remove clamp 42 from flange 30, tabs 64 may be deflected upward to disengage retaining slots 58. However, in normal use of air filter assembly 10 for purposes of changing air filter units 35, clamp 42 remains engaged with housing portion 16 to prevent loss of clamp 42.

It will be understood that the above description is of the preferred exemplary embodiment of the invention and various modifications thereof, and that the invention is not limited to the specific forms or uses shown and discussed. Accordingly, substitutions, modifications, changes and omissions may be made in the design and arrangement of the elements of the preferred embodiment without departing from the spirit of the invention as expressed in the appended claims.

What is claimed is:

1. An air filter housing comprising:

a compressible seal;

a first housing portion including a first edge including at least two spaced hook members;

a second housing portion including a second edge including at least one hook member; and a one-piece clamp having a generally U-shaped cross-section including first and second legs, the first and second legs being generally parallel, the first leg including at least two spaced catches, and the second leg including at least one catch;

wherein the first and second housing portions are joinable to form an enclosure and the seal is positioned between the first and second housing portions generally at the first and second edges, the catches of the first leg are engaged with the two spaced hook members of the first housing portion, and the catch of the second leg is engaged with the hook member of the second housing portion to compress the seal between the first and second housing portions.

2. The housing of claim 1, wherein the hook member of the second housing portion includes at least one retaining slot generally parallel with the second edge, and the clamp includes a retaining tab which engages the retaining slot to permit the clamp to slide parallel to the first and second edges within a predetermined limited range of motion to permit disengagement of the two spaced hook members of the first housing portion and the catches of the first leg.

3. The housing of claim 2, wherein the retaining tab is generally L-shaped, the tab and the catch of the second leg engaging the hook member of the second housing portion to permit rotation of the clamp about the hook member of the second housing portion away from the first edge.

4. The housing of claim 3, wherein one of the first or second housing portions includes a stop member configured to stop motion of the clamp after a predetermined amount of sliding motion in one direction along the first and second edges.

5. The housing of claim 1, wherein one of the first or second edges includes a spacer member which engages the other of the first and second edges when the clamp is engaged with the hook members and the seal is compressed a predetermined amount.

6. The housing of claim 1, wherein each housing portion includes an opening through which air can flow and the seal supports an air filter element between the openings, the first edge and the second edge, the seal and the filter being configured to provide a sealed air path through the filter element between the openings when the housing portions are engaged by the clamp.

7. The housing of claim 2, wherein the housing portions are joined by an attachment member that permits disassembly of the housing portions.

8. An air filter assembly comprising:

an air filter element joined to and circumscribed by a seal;

a first housing portion including a first air passage and a first seal flange, the first seal flange including first and second latch surfaces spaced along the first seal flange;

a second housing portion including a second air passage and a second seal flange including a third latch surface; and a one-piece clamp including first, second and third catches;

wherein the first and second seal flanges are joined by the seal to form a generally air-tight air path between the first and second air passages, the first, second and third latch surfaces being engaged with the first, second and third catches, respectively, to compress the seal between the first and second seal flanges.

9. The assembly of claim 8, wherein the first seal flange includes at least one retaining slot generally parallel therewith, and the clamp includes a retaining tab which engages the retaining slot to permit the clamp to slide parallel to the first and second seal flanges within a predetermined limited range of motion to permit disengagement of the first and second latch surfaces and the first and second catches.

10. The assembly of claim 9, wherein the retaining tab is generally L-shaped, and the tab and the third catch engage the second seal flange to permit rotation of the clamp about the second seal flange.

11. The assembly of claim 10, wherein one of the first or second housing portions includes a stop member configured to stop motion of the clamp after a predetermined amount of sliding motion in one direction along the first and second seal flanges.

12. The assembly of claim 8, wherein one of the first or second seal flanges includes a spacer member which engages the other of the first and second seal flanges when the clamp is engaged with latch surfaces and the seal is compressed to a predetermined height.

13. The assembly of claim 9, wherein the housing portions are joined by an attachment member which permits disassembly of the housing portions.

14. An air filter assembly comprising:

an air filter element joined to and circumscribed by a resilient seal having a rectangular shape;

a first housing portion including a first air passage tube attached thereto and a first opening defined by first and second parallel seal flanges joined to third and fourth seal flanges, wherein the opening has the rectangular shape, the first seal flange including at least four spaced latch surfaces, and the second seal flange including a first hooking arrangement;

a second housing portion including a second air passage tube attached thereto and a second opening defined by fifth and sixth parallel seal flanges joined to seventh and eight seal flanges, wherein the second opening has the rectangular shape, the fifth seal flange including a bottom latch surface, and the sixth seal flange including a second hooking arrangement; and a one-piece clamp including at least four spaced top catches and at least four bottom catches;

wherein the seal flanges of the housings are joined by the seal to form a generally air-tight air path between the first and second air passage tubes, the four spaced latch surfaces being engaged with the top catches, the bottom latch surface being engaged with the four bottom catches, and the first and second hooking arrangements being joined to compress the seal between the first and second seal flanges.

15. The assembly of claim 14, wherein the housing portion and the one-piece clamp are molded from plastic.

16. The assembly of claim 14, wherein the fifth seal flange includes at least one retaining slot generally parallel therewith, and the clamp includes a retaining tab which engages the retaining slot to permit the clamp to slide parallel to the first and fifth seal flanges within a predetermined limited range of motion to permit disengagement of the four spaced latch surfaces and the top catches.

17. The assembly of claim 16, wherein the retaining tab is generally L-shaped, and the tab and four bottom catches engage the fifth seal flange to permit rotation of the clamp about the fifth seal flange.

18. The assembly of claim 17, wherein one of the first or second housing portions includes a stop member configured to stop motion of the clamp after a predetermined amount of sliding motion in one direction along the first and fifth seal flanges.

19. The assembly of claim 18, wherein the seal flanges of the first or second housing portion include a spacer member which engages the other of the seal flanges when the clamp is engaged with latch surfaces and the seal is compressed to a predetermined height.

20. The assembly of claim 9, wherein the first and second hooking arrangements are configured to permit disassembly of the housing portions.

* * * * *